(12) United States Patent
Aso

(10) Patent No.: US 9,415,682 B2
(45) Date of Patent: Aug. 16, 2016

(54) REFUELING PORTION STRUCTURE OF FUEL TANK

(71) Applicant: TOYOTA JIDOSHA KABUSHIKI KAISHA, Toyota-shi, Aichi-ken (JP)

(72) Inventor: Shuichi Aso, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/832,355

(22) Filed: Aug. 21, 2015

(65) Prior Publication Data

US 2016/0068062 A1   Mar. 10, 2016

(30) Foreign Application Priority Data

Sep. 9, 2014 (JP) .................. 2014-183617

(51) Int. Cl.
| | |
|---|---|
| B65D 49/02 | (2006.01) |
| B60K 15/04 | (2006.01) |
| B60K 15/05 | (2006.01) |
| B65D 55/02 | (2006.01) |

(Continued)

(52) U.S. Cl.
CPC .................. *B60K 15/04* (2013.01); *B60K 15/03* (2013.01); *B60K 15/035* (2013.01); *B60K 15/05* (2013.01); *B60K 2015/0319* (2013.01); *B60K 2015/0359* (2013.01); *B60K 2015/03296* (2013.01); *B60K 2015/03368* (2013.01); *B60K 2015/03585* (2013.01); *B60K 2015/0461* (2013.01); *B60K 2015/0474* (2013.01); *B60K 2015/0477* (2013.01); *B60K 2015/0515* (2013.01); *B60K 2015/0538* (2013.01)

(58) Field of Classification Search
CPC ........... B60K 15/04; B60K 2015/0461; B60K 15/05; B60K 2015/03296; B60K 2015/03368; B60K 2015/0474; B60K 2015/0477; B60K 2015/0515; B60K 2015/03585; B60K 2015/0538; B60K 15/03; B60K 15/035; B60K 2015/0319; B60K 2015/0359
USPC .................................. 220/86.2, 86.1, 203.19
See application file for complete search history.

(56) References Cited

U.S. PATENT DOCUMENTS

| | | | | |
|---|---|---|---|---|
| 5,921,424 A | * | 7/1999 | Palvolgyi | B60K 15/03519 141/301 |
| 6,009,920 A | * | 1/2000 | Palvoelgyi | B60K 15/03519 137/588 |
| 6,230,739 B1 | * | 5/2001 | Gericke | B60K 15/04 137/588 |

(Continued)

FOREIGN PATENT DOCUMENTS

| | | |
|---|---|---|
| JP | 2006-299994 A | 11/2006 |
| JP | 2008-265621 A | 11/2008 |

(Continued)

*Primary Examiner* — J. Gregory Pickett
*Assistant Examiner* — Niki M Eloshway
(74) *Attorney, Agent, or Firm* — Oliff PLC

(57) ABSTRACT

A refueling portion structure of a fuel tank includes: a refueling pipe that has a refueling port into which a refueling nozzle is to be inserted, and that communicates with a fuel tank; an opening/closing valve that is provided on a flow path within the refueling pipe and closes the flow path, and that, when pushed by the refueling nozzle, opens the flow path; and a valve opening/closing device that, in a case in which a tank internal pressure of the fuel tank exceeds a set value that is set in advance, restricts or inhibits opening operation of the opening/closing valve, and, in a case in which the tank internal pressure is less than or equal to the set value, permits the opening operation of the opening/closing valve.

6 Claims, 12 Drawing Sheets

(51) Int. Cl.
*B60K 15/03* (2006.01)
*B60K 15/035* (2006.01)

(56) References Cited

U.S. PATENT DOCUMENTS

| | | | |
|---|---|---|---|
| 6,279,626 B1 * | 8/2001 | Schmitt | B60K 15/0409 141/285 |
| 6,415,827 B1 * | 7/2002 | Harris | B60K 15/03519 141/302 |
| 6,637,477 B1 * | 10/2003 | Maier | B60K 15/03519 137/588 |
| 6,755,057 B2 * | 6/2004 | Foltz | B60K 15/04 141/312 |
| 2009/0001077 A1 * | 1/2009 | Feichtinger | B60K 15/04 220/86.2 |
| 2013/0228576 A1 * | 9/2013 | Gerdes | B60K 15/0406 220/86.2 |
| 2013/0340866 A1 | 12/2013 | Sasaki | |

FOREIGN PATENT DOCUMENTS

| | | |
|---|---|---|
| JP | 2012-162165 A | 8/2012 |
| JP | 2013-071683 A | 4/2013 |

* cited by examiner

REFUELING PORTION STRUCTURE OF FUEL TANK

CROSS-REFERENCE TO RELATED APPLICATION

This application is based on and claims priority under 35 USC 119 from Japanese Patent Application No. 2014-183617 filed on Sep. 9, 2014, the disclosure of which is incorporated by reference herein.

BACKGROUND

1. Technical Field

The present invention relates to a refueling portion structure of a fuel tank.

2. Related Art

Japanese Patent Application Laid-Open (JP-A) No. 2012-162165 discloses a refueling portion structure in which an opening/closing valve, that opens a flow path when pushed by a refueling nozzle, is provided at the flow path that is within a refueling pipe for refueling a fuel tank.

In the refueling portion structure disclosed in JP-A No. 2012-162165, when the opening/closing valve that is within the refueling pipe is opened in a state in which the internal pressure of the fuel tank is high, there is the concern that the evaporated fuel within the fuel tank will pass-through the refueling pipe and be released forcefully.

SUMMARY

In consideration of the above-described circumstances, an object of an aspect of the present invention is to provide a refueling portion structure of a fuel tank that can suppress the forceful release of evaporated fuel from a refueling pipe when an opening/closing valve within the refueling pipe is opened.

A refueling portion structure of a fuel tank of a first aspect of the present invention has: a refueling pipe that has a refueling port into which a refueling nozzle is to be inserted, and that communicates with a fuel tank; an opening/closing valve that is provided on a flow path within the refueling pipe and closes the flow path, and that, when pushed by the refueling nozzle, opens the flow path; and a valve opening/closing device that, in a case in which a tank internal pressure of the fuel tank exceeds a set value that is set in advance, restricts or inhibits opening operation of the opening/closing valve, and, in a case in which the tank internal pressure is less than or equal to the set value, permits the opening operation of the opening/closing valve.

In the refueling portion structure of a fuel tank of the first aspect, in a case in which the tank internal pressure of the fuel tank exceeds the set value that is set in advance, the valve opening/closing device restricts or inhibits the opening operation of the opening/closing valve. Thus, even if the opening/closing valve is pushed by the refueling nozzle, a portion of or the entire flow path is not opened, and the evaporated fuel within the fuel tank being forcefully released from the refueling pipe is suppressed.

On the other hand, in a case in which the tank internal pressure is less than or equal to the set value, the valve opening/closing device permits the opening operation of the opening/closing value. Therefore, the entire flow path can be opened due to the opening/closing valve being pushed by the refueling nozzle. At this time, because the tank internal pressure is less than or equal to the set value, evaporated fuel being forcefully released from the refueling pipe is suppressed.

In a refueling portion structure of a fuel tank of a second aspect of the present invention, in the refueling portion structure of a fuel tank of the first aspect, the valve opening/closing device has: a valve opening/closing member that abuts the opening/closing valve and restricts or inhibits the opening operation of the opening/closing valve; a moving device that moves the valve opening/closing member between an abutting position of abutting the opening/closing valve and a withdrawn position of not abutting the opening/closing valve; and a control device that controls the moving device, and that causes the valve opening/closing member to move to the abutting position in a case in which the tank internal pressure exceeds the set value, and causes the valve opening/closing member to move to the withdrawn position in a case in which the tank internal pressure is less than or equal to the set value.

In the refueling portion structure of a fuel tank of the second aspect, in a case in which the tank internal pressure exceeds the set value, the control device controls the moving device and causes the valve opening/closing member to move to the abutting position. Thus, the valve opening/closing member abuts the opening/closing valve, and the opening operation of the opening/closing valve is restricted or inhibited.

On the other hand, in a case in which the tank internal pressure is less than or equal to the set value, the control device controls the moving device and causes the valve opening/closing member to move to the withdrawn position. Therefore, the valve opening/closing member does not abut the opening/closing valve, and the opening operation of the opening/closing valve is permitted.

In this way, the permitting and the restricting or inhibiting of the opening operation of the opening/closing valve are switched by the simple structure of the control device controlling the moving device and causing the valve opening/closing member to move.

In a refueling portion structure of a fuel tank of a third aspect of the present invention, in the refueling portion structure of a fuel tank of the second aspect, provided between the valve opening/closing member and the moving device is an elastic member that, when the valve opening/closing member that is at the abutting position is pushed by the opening/closing valve that is in the midst of closing operation, elastically deforms and causes the valve opening/closing member to temporarily withdraw from a locus of movement of the opening/closing valve.

In the refueling portion structure of a fuel tank of the third aspect, even if there were a case in which, after the refueling nozzle is pulled-out, the tank internal pressure exceeds the set value and the valve opening/closing member is moving to the abutting position before the opening/closing valve returns to the closed state, when the valve opening/closing member is pushed by the opening/closing valve that is in the midst of the closing operation, the elastic member elastically deforms, and the valve opening/closing member temporarily withdraws from the locus of movement of the opening/closing valve. Therefore, the opening/closing valve can reliably be returned to the closed state. Note that, after the opening/closing valve has gone past, the valve opening/closing member returns onto the locus of movement of the opening/closing valve due to the restoring force of the elastic member, and the opening operation of the opening/closing valve is restricted or inhibited.

In a refueling portion structure of a fuel tank of a fourth aspect of the present invention, in the refueling portion structure of a fuel tank of the third aspect, the valve opening/closing member is shaped as a pillar, an inclined surface is formed at a fuel tank side corner portion of one end portion of the valve opening/closing member, and another end portion of the valve opening/closing member is elastically supported by the elastic member with respect to the moving device, and, in a case in which the valve opening/closing member is at the abutting position, the inclined surface is pushed by the opening/closing valve that is in the midst of the closing operation.

In the refueling portion structure of a fuel tank of the fourth aspect, even if there were a case in which, after the refueling nozzle is pulled-out, the tank internal pressure exceeds the set value and the valve opening/closing member is moving to the abutting position before the opening/closing valve returns to the closed state, when the inclined surface of the valve opening/closing member is pushed by the opening/closing valve that is in the midst of the closing operation, the moving force of the opening/closing valve becomes, via the inclined surface, force that elastically deforms the elastic member that elastically supports the valve opening/closing member, and the valve opening/closing member is made to temporarily withdraw from the locus of movement of the opening/closing valve. Therefore, the opening/closing valve can reliably be returned to the closed state.

A refueling portion structure of a fuel tank of a fifth aspect of the present invention has, in the refueling portion structure of a fuel tank of the second aspect: a lid that is provided at a vehicle body, that, in a closed state, covers the refueling port, and that, due to an opening switch being operated to open the lid, is opened and exposes the refueling port; and a pressure reducing device that is connected to the fuel tank, is controlled by the control device, and reduces the tank internal pressure when the opening switch is operated to open the lid.

In the refueling portion structure of a fuel tank of the fifth aspect, when the opening switch is operated to open the lid, the pressure reducing device that is controlled by the control device reduces the tank internal pressure. Due thereto, when the opening/closing valve that is within the refueling pipe is opened at the time of refueling, the evaporated fuel being forcefully released from the refueling pipe can be reliably suppressed.

In a refueling portion structure of a fuel tank of a sixth aspect of the present invention, in the refueling portion structure of a fuel tank of the fifth aspect, the control device causes the tank internal pressure to be reduced by the pressure reducing device, until the tank internal pressure becomes less than or equal to the set value.

In the refueling portion structure of a fuel tank of the sixth aspect, the control device controls the pressure reducing device, and causes the tank internal pressure to be reduced until the tank internal pressure becomes less than or equal to the set value. Therefore, when the opening/closing valve that is within the refueling pipe is opened at the time of refueling, the evaporated fuel being forcefully released from the refueling pipe can be more reliably suppressed.

The refueling portion structure of a fuel tank of the first aspect of the present invention has the excellent effect that, when the opening/closing valve that is within the refueling pipe is opened, forceful release of evaporated fuel from the refueling pipe can be suppressed.

The refueling portion structure of a fuel tank of the second aspect of the present invention has the excellent effect that the permitting and the restricting or inhibiting of the opening operation of the opening/closing valve that is within the refueling pipe can be switched by a simple structure.

The refueling portion structure of a fuel tank of the third aspect of the present invention has the excellent effect that, after the refueling nozzle is pulled-out, the opening/closing valve that is within the refueling pipe can be reliably set in the closed state.

The refueling portion structure of a fuel tank of the fourth aspect of the present invention has the excellent effect that, after the refueling nozzle is pulled-out, the opening/closing valve that is within the refueling pipe can be more reliably set in the closed state.

The refueling portion structure of a fuel tank of the fifth aspect of the present invention has the excellent effect that, when the opening/closing valve that is within the refueling pipe is opened, forceful release of evaporated fuel from the refueling pipe can be reliably suppressed.

The refueling portion structure of a fuel tank of the sixth aspect of the present invention has the excellent effect that, when the opening/closing valve that is within the refueling pipe is opened, forceful release of evaporated fuel from the refueling pipe can be more reliably suppressed.

BRIEF DESCRIPTION OF THE DRAWINGS

Exemplary embodiments of the present invention will be described in detail based on the following figures, wherein.

DETAILED DESCRIPTION

Refueling portion structures of a fuel tank of embodiments of the present invention are described hereinafter.

First Embodiment

First, a fuel tank device 20, to which is applied a refueling portion structure of a fuel tank (hereinafter simply called "refueling portion structure") 24 of a first embodiment of the present invention, is described.

Figure 1:
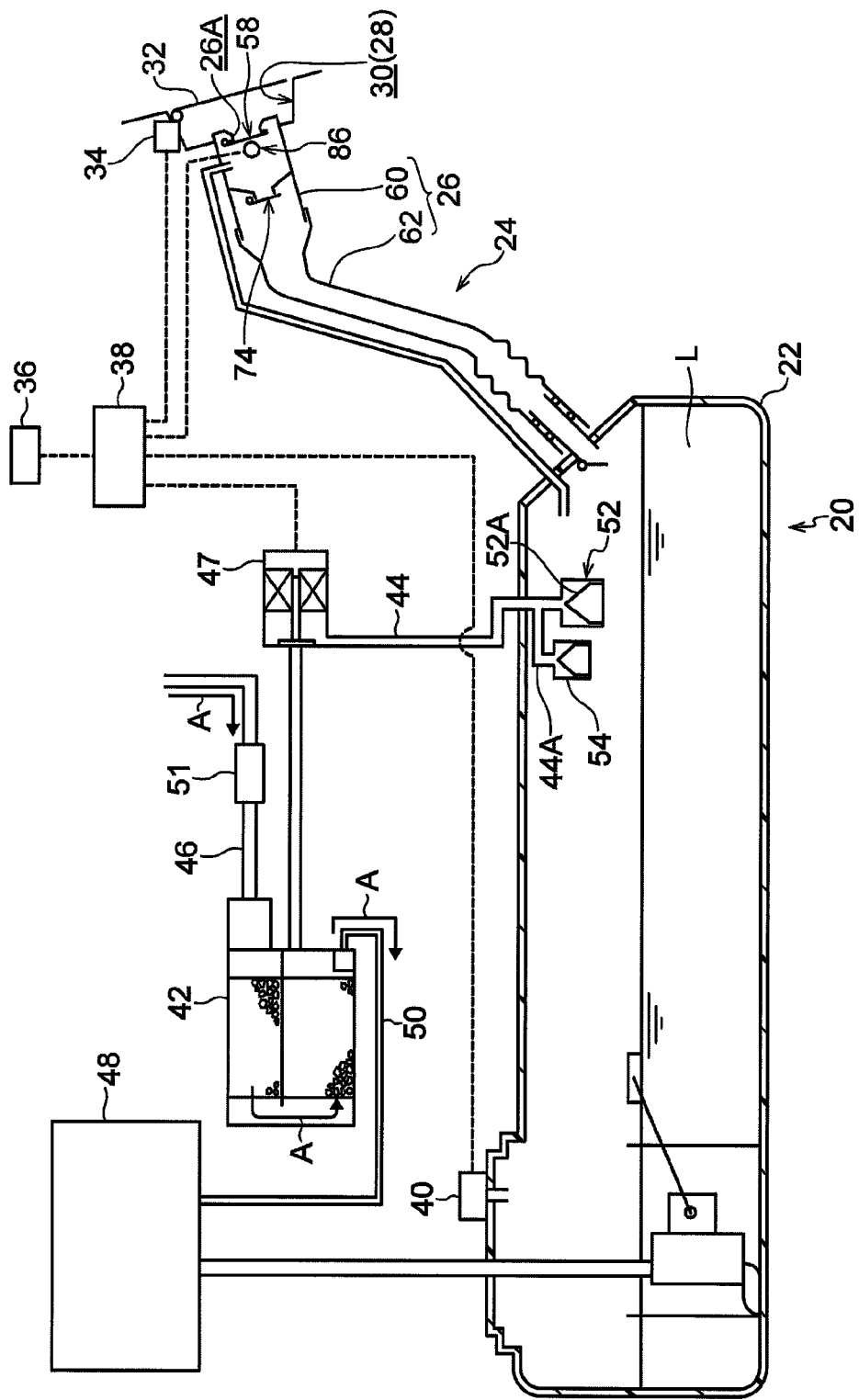
FIG. 1 is a schematic structural drawing of a fuel tank device to which is applied a refueling portion structure of a fuel tank of a first embodiment of the present invention.
Figure 2:
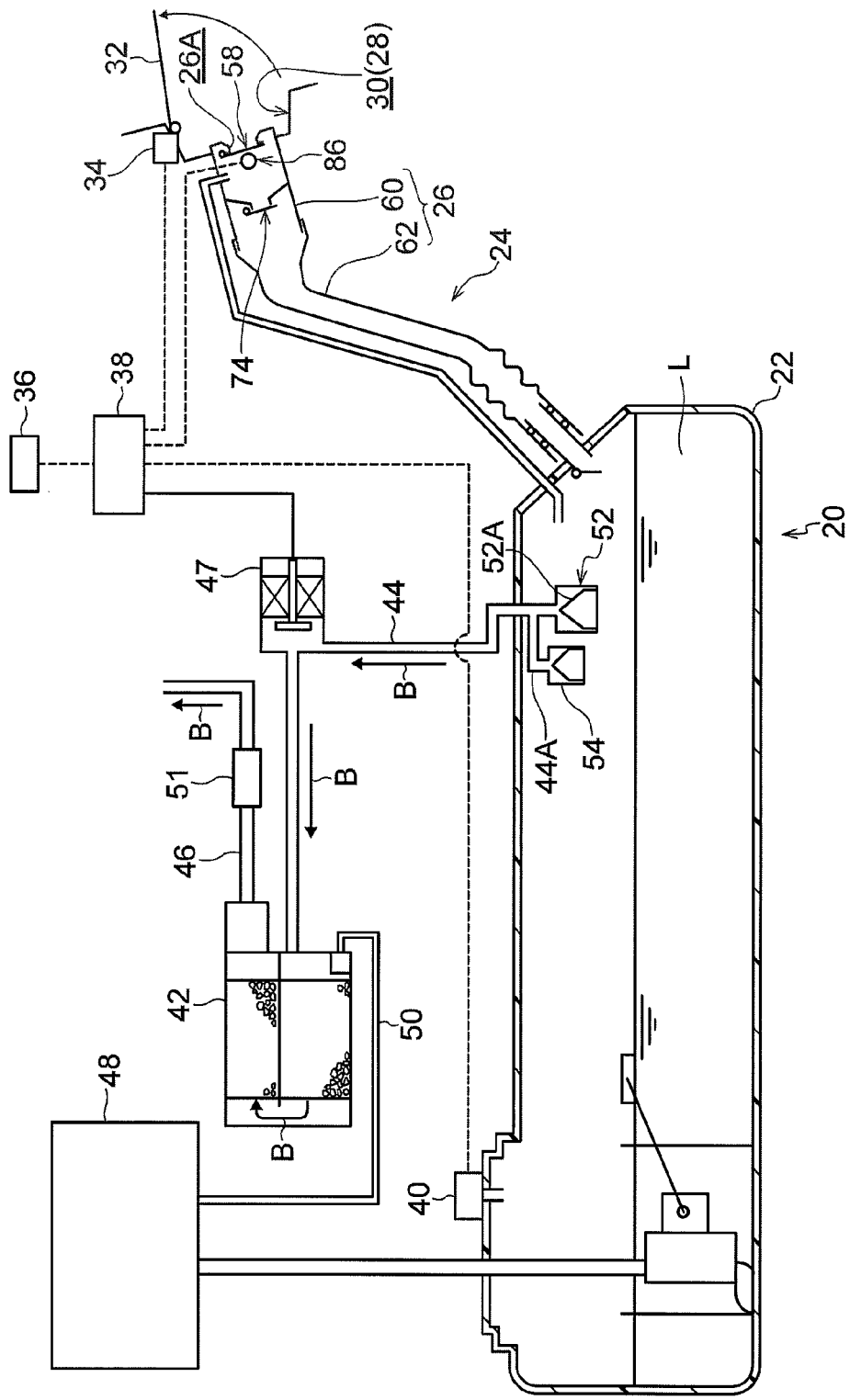
FIG. 2 is a schematic structural drawing showing a time of refueling of the fuel tank device of FIG. 1.

As shown in FIG. 1 and FIG. 2, the fuel tank device 20 has a fuel tank 22 and the refueling portion structure 24.

The fuel tank 22 can accommodate fuel L. The lower end portion of a filler pipe 26 is connected to the upper portion of the fuel tank 22, and the interior of the fuel tank 22 and the interior of the filler pipe 26 communicate with one another. On the other hand, the upper end portion of the filler pipe 26 is mounted to a concave portion 30 that is provided in an outer panel of a vehicle body 28 and is concave toward the vehicle body inner side. The opening at the upper end portion of the filler pipe 26 is made to be a refueling port 26A into which a refueling nozzle 100 is inserted. The fuel tank 22 can be refueled due to the refueling nozzle 100 being inserted in this refueling port 26A.

A fuel lid 32, that can open and close and that covers the concave portion 30 from the vehicle outer side, is provided at the outer panel of the vehicle body 28. The refueling port 26A of the filler pipe 26 is covered by this fuel lid 32 being closed. Further, the fuel lid 32 is opened by a lid opening device 34. Concretely, for example, when opening operation information of a lid opening switch 36, that is provided within the vehicle cabin or the like, is sent to a control device 38, the control device 38 operates the lid opening device 34 and causes the fuel lid 32 to be opened. Note that the fuel lid 32 of the present embodiment is an example of the lid in the present invention. Further, in the present embodiment, an engine control unit (hereinafter simply called "ECU") is used as the control, device 38. The fuel lid 32 of the present embodiment is an example of the lid in the present invention, and structures a portion of the refueling portion structure 24.

A tank internal pressure sensor 40 is provided at the fuel tank 22. Information of tank internal pressure P, that is sensed by the tank internal pressure sensor 40, is sent to the control device 38.

A canister 42, in whose interior is accommodated an adsorbent such as activated carbon or the like, is provided at the exterior of the fuel tank 22. This canister 42 communicates with the upper portion of the fuel tank 22 through a vapor pipe 44. This vapor pipe 44 is structured so as to be able to send vapor (vapor that includes evaporated fuel) that is within the fuel tank 22 to the canister 42. The evaporated fuel, that is within the vapor that is sent from the fuel tank 22 interior, is adsorbed by the adsorbent of the canister 42, and the vapor other than that (i.e., the atmospheric air component) is discharged into the atmosphere from an atmosphere communication pipe 46. Note that what is called "evaporated fuel" here is the fuel L that has evaporated.

A sealing valve 47 (in the present embodiment, an electromagnetic valve as an example) is provided midway along the vapor pipe 44. This sealing valve 47 is controlled to open and close by the control device 38. In the open state of the sealing valve 47, vapor within the fuel tank 22 can move through the vapor pipe 44 to the canister 42. Therefore, the tank internal pressure P of the fuel tank 22 interior can be reduced. On the other hand, in the closed state of the sealing valve 47, movement of the vapor that is within the fuel tank 22 to the canister 42 is inhibited. Note that the sealing valve 47 of the present embodiment is an example of the pressure reducing device of the present invention, and structures a portion of the refueling portion structure 24.

Further, the canister 42 communicates, through a purge pipe 50, with an unillustrated intake path (intake manifold) of an engine 48. Here, as shown in FIG. 1, due to negative pressure of the engine 48 being applied to the canister 42 in the state in which the sealing valve 47 is closed, atmospheric air is introduced-in from the atmosphere communication pipe 46, and the evaporated fuel that has been adsorbed by the adsorbent can be desorbed (purged). The evaporated fuel that is desorbed is sent to the engine 48 and combusted. Note that, in FIG. 1, the flow of vapor at the time of purging is shown by arrow A. Further, an air filter 51, the removes foreign substances that are within the introduced atmospheric air, is provided midway along the atmosphere communication pipe 46.

A fill-up regulating valve 52, that has a valve body 52A that is float-like, is provided at the lower end of the vapor pipe 44. Even in cases in which the liquid surface of the fuel L rises at the time of refueling, the valve body 52A does not close the vapor pipe 44 until the liquid surface reaches the fill-up regulating valve 52, and therefore, refueling is not impeded. When the liquid surface reaches the fill-up regulating valve 52 and the valve body 52A floats in the fuel and closes the vapor pipe 44, the vapor within the fuel tank 22 can no longer move to the canister 42.

A vicinity of the lower end portion of the vapor pipe 44 within the fuel tank 22 is branched-off such that a branch pipe 44A is structured. A cut-off valve 54 is provided at the lower end of the branch pipe 44A. The cut-off valve 54 is provided within the fuel tank 22 at a position that is higher than the fill-up regulating valve 52. When the tank internal pressure P of the fuel tank 22 rises and exceeds a predetermined value (a numerical value that is less than or equal to a set value N that is described later of the present embodiment), this cut-off valve 54 enters into an open state, and vapor that is within the fuel tank 22 can move to the canister 42. For example, even if the fill-up regulating valve 52 is closed, due to the cut-off valve 54 being opened, vapor within the fuel tank 22 can move to the canister 42. Due thereto, an excessive rise in the tank internal pressure of the fuel tank 22 is suppressed.

The refueling portion structure 24 of the present embodiment is described in detail next on the basis of FIG. 3 through FIG. 7. Note that arrow UP that is shown appropriately in these drawings indicates the vehicle upper side, and arrow X indicates the insertion direction of the refueling nozzle 100.

Figure 3:
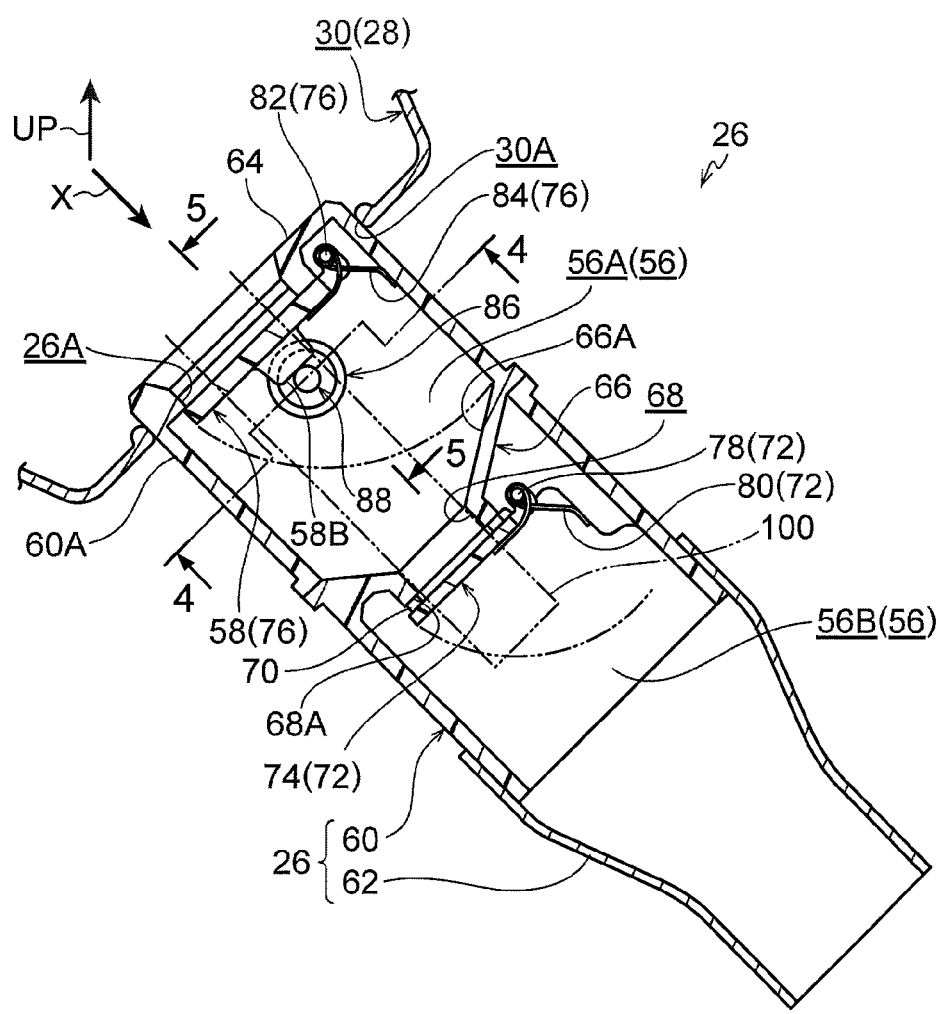
FIG. 3 is a cross-sectional view along the axial direction of a refueling pipe that is used in the refueling portion structure of a fuel tank of the first embodiment.

As shown in FIG. 3, the refueling portion structure 24 has the filler pipe 26, and an outer cover 58 that is provided at a flow path 56 within the filler pipe 26 and closes the flow path 56, and that, when pushed by the distal end portion of the refueling nozzle 100, opens the flow path 56. Note that the filler pipe 26 of the present embodiment is an example of the refueling pipe of the present invention, and the outer cover 58 of the present embodiment is an example of the opening/closing valve of the present invention.

The filler pipe 26 has a refueling port member 60 that is cylindrical tube shaped and structures the refueling port 26A and is mounted to the concave portion 30, and a pipe main body 62 that is cylindrical tube shaped and to whose upper end portion (near side end portion) the refueling port member 60 is mounted, and whose lower end portion (far side end portion) is connected to the fuel tank 22.

Note that, in the present embodiment, when merely "the near side" is used, it means the near side of the filler pipe 26, i.e., the refueling port 26A side, and, when "the far side" is used, it means the far side of the filler pipe 26, i.e., the fuel tank 22 side. Further, when merely "the radial direction" is used, it means the radial direction of the filler pipe 26. When "the axial direction" is used, it means the axial direction of the filler pipe 26.

The refueling port member 60 is mounted to the concave portion 30 in a state of being inserted in a mounting hole 30A that is formed in the concave portion 30, and the near side end portion of the refueling port member 60 is exposed to the vehicle body outer side. Further, an overhanging portion 64, that is annular and juts-out toward the radial direction inner side, is formed at the near side end portion of the refueling port member 60. The opening that is formed at the inner side of this overhanging portion 64 is the refueling port 26A.

A tube portion 66, that is substantially cylindrical tube shaped and is shaped such that the diameter thereof gradually decreases from the near side toward the far side, is formed at an axial direction intermediate portion (in the present embodiment, in a vicinity of the central portion) of the refueling port member 60. An opening 68 that is formed at the far side end portion of this tube portion 66 is made to have an opening diameter that is slightly larger than the nozzle diameter of the refueling nozzle 100. Due to this tube portion 66, when the refueling nozzle 100 is inserted-in from the refueling port 26A, the distal end portion of the refueling nozzle 100 contacts an inner peripheral surface 66A of the tube portion 66 and is guided toward the opening 68.

Further, a rubber seal 70 that is annular is mounted to a hole edge 68A of the opening 68 of the tube portion 66 (in the present embodiment, the far side end surface of the tube portion 66), along the hole edge 68A.

A first opening/closing portion 72 for opening and closing the opening 68 is provided at the refueling port member 60. The opening 68 is closed by a flapper valve 74 that structures this first opening/closing portion 72.

Further, a second opening/closing portion 76 for opening and closing the refueling port 26A is provided at the refueling port member 60, further toward the near side than the first opening/closing portion 72. The refueling port 26A is closed by the outer cover 58 that structures this second opening/closing portion 76.

Therefore, the flow path 56 that is within the filler pipe 26 is structured to include a first flow path 56A from the outer cover 58 to the flapper valve 74, and a second flow path 56B from the flapper valve 74 to the fuel tank 22.

The first opening/closing portion 72 has the flapper valve 74, a supporting shaft 78, and an urging spring 80. The flapper valve 72 is formed in the shape of a flat plate that is substantially circular, and the diameter thereof is made to be larger than that of the opening 68 of the tube portion 66. As shown in FIG. 3, in the state in which the flapper valve 74 is closed (hereinafter called "closed state" as appropriate), the near side surface of the flapper valve 74 contacts the rubber seal 70 provided at the opening edge 68A, and the region between the tube portion 66 and the flapper valve 74 is sealed.

A pair of bearing portions 74A are provided at an end portion of the flapper valve 74. The supporting shaft 78, that rotatably supports the flapper valve 74, is inserted-through these bearing portions 74A. The both end sides of the supporting shaft 78 are respectively inserted-through unillustrated bearing portions that are formed at a peripheral wall portion 60A of the refueling port member 60. Therefore, the opening 68 is opened and closed due to the flapper valve 74 being rotated around the supporting shaft 78. Further, the urging spring 80 is wound on the supporting shaft 78. The urging spring 80 urges the flapper valve 74 in the closing direction. As an example, a torsion coil spring is used as the urging spring 80 of the present embodiment. Here, by pushing the flapper valve 74 by a force that is larger than the urging force of the urging spring 80, the flapper valve 74 rotates around the supporting shaft 78 against the urging force of the urging spring 80, and the opening 68 is opened.

The second opening/closing portion 76 has the outer cover 58, a supporting shaft 82, and an urging spring 84. The outer cover 58 is formed in the shape of a flat plate that is substantially circular, and the diameter thereof is made to be larger than that of the refueling port 26A. Further, the diameter of the outer cover 58 is formed to be larger than the hole diameter of the refueling port 26A, and, as shown in FIG. 3, in the state in which the outer cover 58 is closed, the outer peripheral edge portion of the outer cover 58 and the hole edge of the refueling port 26A contact one another.

Here, a pair of bearing portions 58A are provided at an end portion of the outer cover 58. The supporting shaft 82, that rotatably supports the outer cover 58, is inserted-through these bearing portions 58A. The supporting shaft 82 is inserted-through bearing portions 60C that are respectively formed at the peripheral wall portion 60A of the refueling port member 60. Therefore, the refueling port 26A is opened and closed due to the outer cover 58 being rotated around the supporting shaft 82. Further, the urging spring 84 is wound on the supporting shaft 82. The urging spring 84 urges the outer cover 58 in the closing direction. As an example, a torsion coil spring is used as the urging spring 84 of the present embodiment. Here, by pushing the outer cover 58 by a force that is larger than the urging force of the urging spring 84, the outer cover 58 rotates around the supporting shaft 82 against the urging force of the urging spring 84, and the refueling port 26A is opened.

Further, as shown in FIG. 3 through FIG. 7, the refueling portion structure 24 of the present embodiment has a valve opening/closing device 86 that inhibits the opening operation of the outer cover 58 when the tank internal pressure P of the fuel tank 22 exceeds the set value N that is set in advance, and that permits the opening operation of the outer cover 58 when the tank internal pressure P is less than or equal to the set value N. Note that the valve opening/closing device 86 of the present embodiment is an example of the valve opening/closing device of the present invention.

Figure 5:
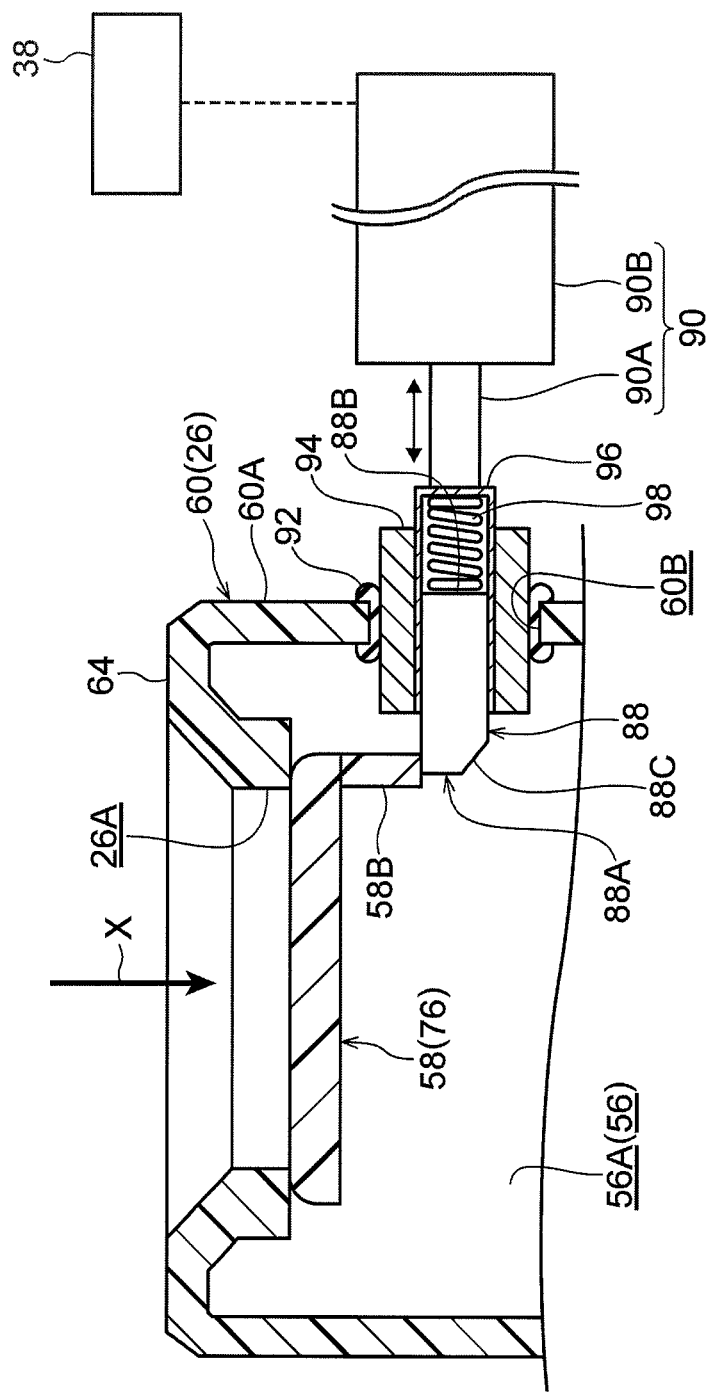
FIG. 5 is a cross-sectional view in which the refueling pipe of FIG. 3 is cut along line 5-5, and shows a state in which opening operation of an opening/closing valve is inhibited by a valve opening/closing member.
Figure 6:
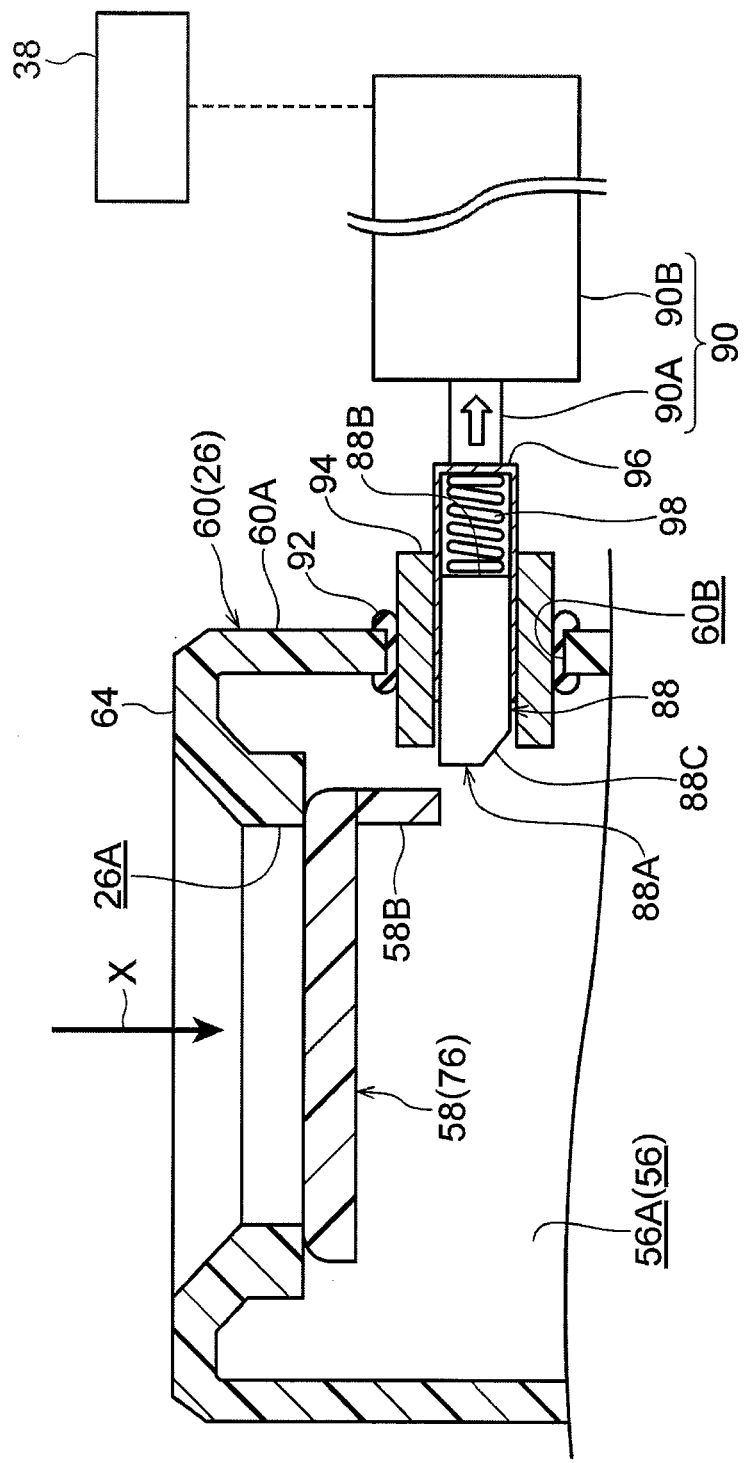
FIG. 6 is a cross-sectional view corresponding to the cross-sectional view of FIG. 5, and shows a state in which the opening operation of the opening/closing valve is permitted.

As shown in FIG. 5, the valve opening/closing device 86 has: a valve opening/closing member 88 that is shaped as a pillar (a substantially solid cylinder in the present embodiment), and that abuts a projecting portion 58B of the outer cover 58 that is in the closed state, and that inhibits the opening operation of the outer cover 58; an actuator 90 that rectilinearly moves the valve opening/closing member 88 between an abutting position (the position shown in FIG. 5 as an example) at which the valve opening/closing member 88 abuts the outer cover 58 that is in the closed state, and a withdrawn position (the position shown in FIG. 6 as an example) at which the valve opening/closing member 88 does not abut the outer cover 58; and the control device 38 that controls operation of the actuator 90. Note that the outer cover 58 of the present embodiment is an example of the opening/closing valve of the present invention, and the actuator 90 of the present embodiment is an example of the moving device of the present invention, and the control device 38 of the present embodiment is an example of the control device of the present invention.

Further, in the present embodiment, there is a structure in which the operation of the actuator 90 is controlled by the control device 38. However, the present invention is not limited to this structure. For example, there may be a structure in which a dedicated control device, that is separate from the control device 38 that is the ECU, is provided, and this control device controls the operation of the actuator 90.

Figure 4:
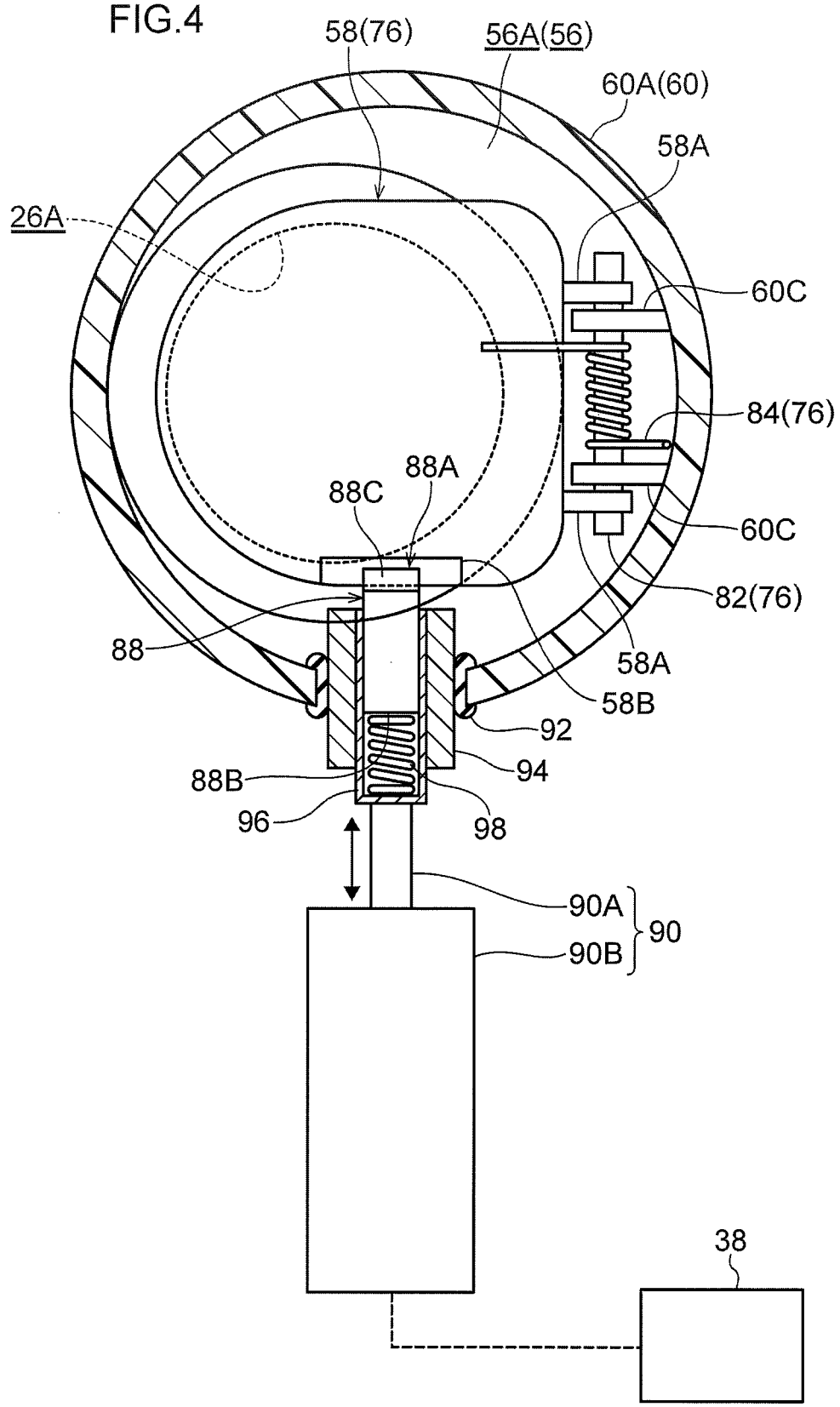
FIG. 4 is a cross-sectional view in which the refueling pipe of FIG. 3 is cut along line 4-4.

As shown in FIG. 4 and FIG. 5, a through-hole 60B is formed in the peripheral wall portion 60A of the refueling port member 60, between the overhanging portion 64 and the tube portion 66. A sealing member 92 that is annular and is U-shaped in cross-section is mounted to the through-hole 60B so as to nip the hole edge portion of the through-hole 60B.

A cylindrical tube member 94 is fit-in the inner side of the sealing member 92, and the cylindrical tube member 94 and the peripheral wall portion 60A are fixed via the sealing member 92.

A sliding member 96, that is shaped as a cylindrical tube having a bottom, is inserted in the inner side of the cylindrical tube member 94. This sliding member 96 is structured so as to be able to slidingly move along the axial direction of the cylindrical tube member 94. Further, the opening portion of the sliding member 96 faces the inner side of refueling port member 60. On the other hand, the distal end of a rod 90A, that is described later, of the actuator 90 is connected to the closed bottom portion of the sliding member 96. The sliding member 96 slidingly moves at the inner side of the cylindrical tube member 94 due to reciprocal movement of the rod 90A of the actuator 90.

A proximal end portion 88B of the valve opening/closing member 88 is inserted in the inner side of the sliding member 96. On the other hand, a distal end portion 88A of the valve opening/closing member 88 projects-out from the opening portion of the sliding member 96. This valve opening/closing member 88 is structured so as to be able to slidingly move along the axial direction of the sliding member 96. Further, the valve opening/closing member 88 falling-out from the opening portion of the sliding member 96 is inhibited by an unillustrated stopper.

As shown in FIG. 4 and FIG. 5, a coil spring 98 that is elastically deformable is disposed at the inner side of the sliding member 96, between the proximal end portion 88B of the valve opening/closing member 88 and the bottom portion of the sliding member 96. The coil spring 98 urges the valve opening/closing member 88 toward the opening side of the sliding member 96. Therefore, the valve opening/closing member 88 is held at the inner side of the sliding member 96 in a state of abutting the aforementioned stopper. In other words, the valve opening/closing member 88 abuts the aforementioned stopper in a state of being elastically supported by the coil spring 98.

Here, when the sliding member 96 is slidingly moved by using the actuator 90, the valve opening/closing member 88 that is held at the sliding member 96 moves between the abutting position and the withdrawn position. As shown in FIG. 5, when the valve opening/closing member 88 is at the abutting position, the top surface of the distal end portion of the valve opening/closing member 88 (the near side surface of the distal end portion 88A) abuts the peak portion of the projecting portion 58B that projects-out from the lower edge portion (the outer edge portion at the far side) of the outer cover 58, and inhibits the opening operation of the outer cover 58. On the other hand, when the valve opening/closing member 88 is at the withdrawn position (concretely, a position at which the valve opening/closing member 88 is withdrawn from the locus of movement of the outer cover 58), opening operation of the outer cover 58 is possible. Note that, in the present embodiment, because the outer cover 58 rotates around the supporting shaft 82, the locus of movement of the valve opening/closing member 88 can also be called the locus of revolution (or locus of rotation).

Figure 7:
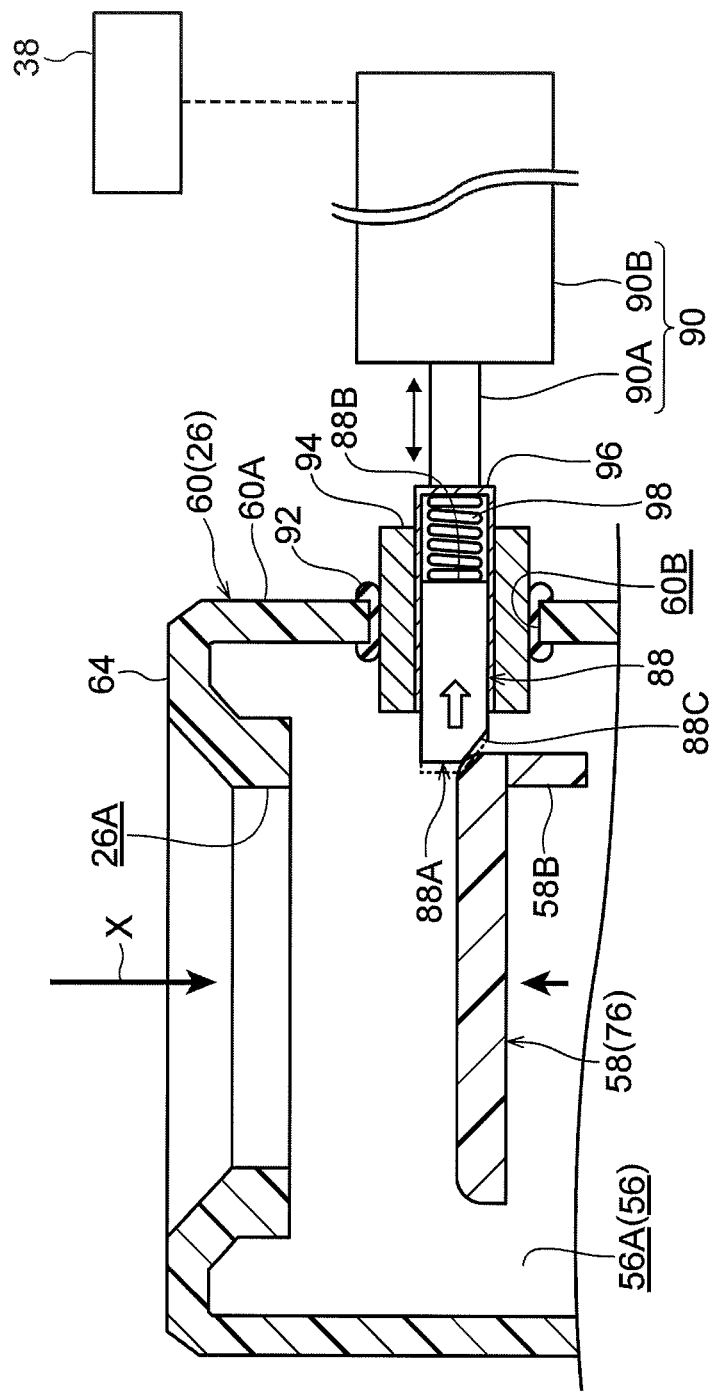
FIG. 7 is a cross-sectional view corresponding to the cross-sectional view of FIG. 5, and shows the operation of the valve opening/closing member temporarily withdrawing from the locus of movement of the opening/closing valve, due to the opening/closing valve that is in the midst of closing operation.

As shown in FIG. 5, an inclined surface 88C is formed at the corner portion at the lower side of the distal end portion (the corner portion at the far side of the distal end portion 88A) of the valve opening/closing member 88. When the valve opening/closing member 88 is at the abutting position, this inclined surface 88C abuts and is pushed by the upper edge portion of the outer cover 58 that is in the midst of the closing operation (see FIG. 7). Here, for example, in a case in which, after the refueling nozzle 100 is pulled-out, the tank internal pressure P exceeds the set value N and the valve opening/closing member 88 is moving to the abutting position before the outer cover 58 returns to the closed state due to the urging force of the urging spring 80, as shown in FIG. 7, when the inclined surface 88C of the valve opening/closing member 88 is pushed by the upper edge portion of the outer cover 58 that is in the midst of the closing operation, the moving force of the outer cover 58 (the urging force of the urging spring 84), via the inclined surface 88C, becomes force that elastically deforms (contractingly deforms) the coil spring 98 that elastically supports the valve opening/closing member 88. When the coil spring 98 contracts, the valve opening/closing member 88 is pushed into the sliding member 96 interior, and temporarily withdraws from the locus of movement of the outer cover 58. Then, when the outer cover 58 goes past, the valve opening/closing member 88 returns to the abutting position due to the restoring force of the coil spring 98, i.e., returns onto the locus of movement of the outer cover 58, and the projecting portion 58B of the outer cover 58 and the valve opening/closing member 88 abut, and the opening operation of the outer cover 58 is inhibited.

The actuator 90 is an electrically-powered actuator, and, as shown in FIG. 5, has a housing 90B that is mounted to the vehicle body 28, and the rod 90A that reciprocally moves rectilinearly with respect to the housing 90B. Various types of parts, such as an unillustrated servo motor, ball screw, slide rail, and the like for reciprocally moving the rod 90A, are built into the housing 90B. Note that the moving device of the present invention is not limited to the actuator 90. For example, an actuator that utilizes air or oil may be used as the moving device of the present invention, or an actuator that utilizes magnetic force may be used. Further, the housing 90B of the actuator 90 is not limited to being mounted to the vehicle body 28, and may be mounted to the filler pipe 26 via a bracket or the like.

Figure 8:
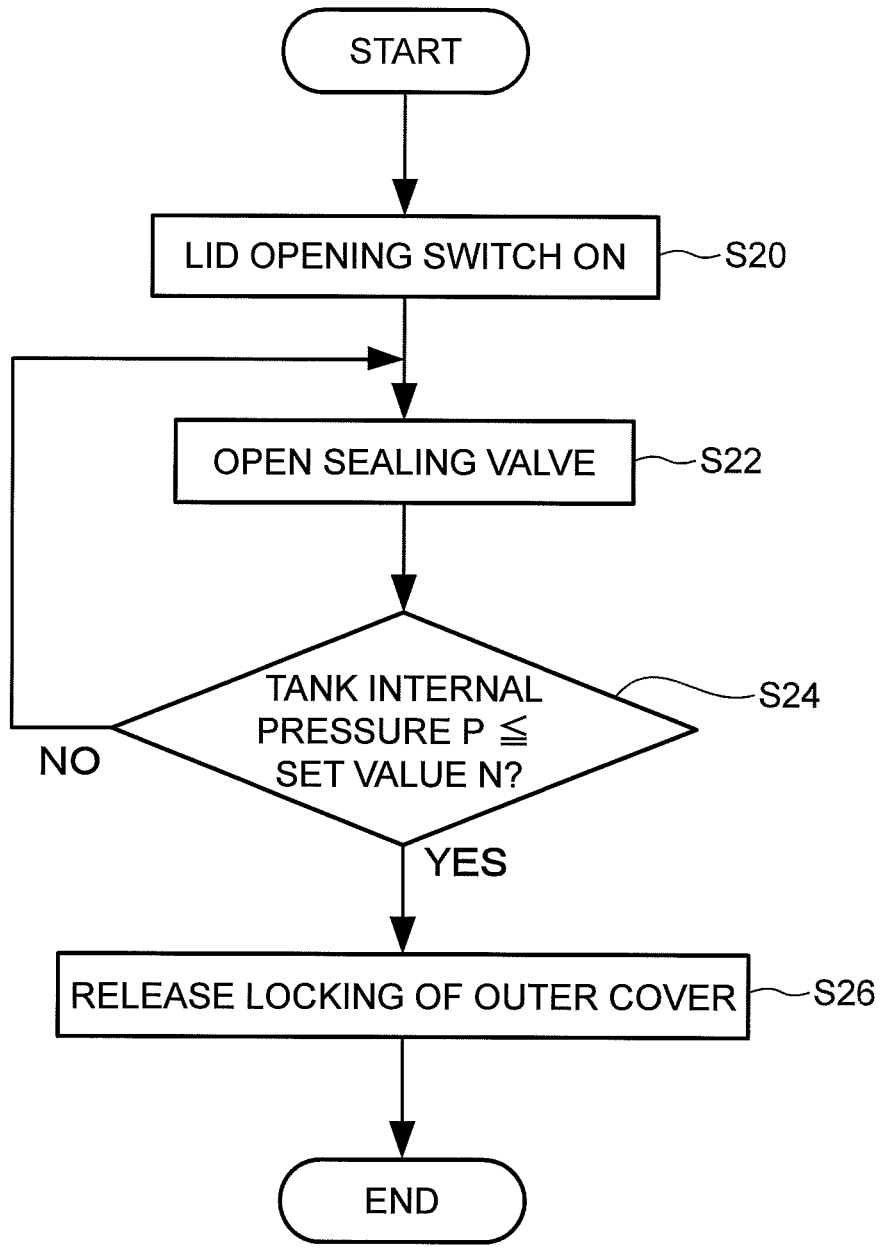
FIG. 8 is a flowchart showing operation of a valve opening/closing device at a time of refueling.

FIG. 8 is a flowchart showing an example of operation of the valve opening/closing device 86 from the operating of the lid opening switch 36 to open the fuel lid 32 at the time of refueling until it becomes possible for the outer cover 58 to open, at the refueling portion structure 24 of the present embodiment.

First, in step S20, when the lid opening switch 36 is operated to open the fuel lid 32, opening operation information is sent to the control device 38, and the routine moves on to step S22.

In step S22, the control device opens the sealing valve 47, and operates the lid opening device 34 so as to cause the fuel lid 32 to open, and thereafter, the routine moves on to step S24. Note that the opening of the sealing valve 47 and the opening of the fuel lid 32 may be simultaneous, or one may be earlier than the other. When the sealing valve 47 is opened, vapor, that includes the evaporated fuel within the fuel tank 22, passes-through the vapor pipe 44 and is sent to the canister 42 by the tank internal pressure P. Due thereto, the tank internal pressure P decreases. Further, of the vapor that includes the evaporated fuel and that is sent to the canister 42, the evaporated fuel is adsorbed by the adsorbent within the canister 42, and the atmospheric air component other than that is discharged (released) into the atmosphere from the atmosphere communication pipe 46. Note that the flow of vapor in the state in which the sealing valve 47 is opened is shown by arrow B in FIG. 2.

Next, in step S24, the tank internal pressure P and the set valve N are compared, and, in a case in which the tank internal pressure P exceeds the set value N, the control device 38 operates the actuator 90 and causes the valve opening/closing member 88 to move to the abutting position. Note that, in a case in which the valve opening/closing member 88 is already moving to the abutting position, the valve opening/closing member 88 is made to standby at the abutting position. Thereafter, the routine moves on to step S22. Namely, until the tank internal pressure P becomes less than or equal to the set value N, the control device 38 maintains the open state of the sealing valve 47 and decreases the tank internal pressure P.

On the other hand, in a case in which the tank internal pressure P is less than or equal to the set value N, the routine moves on to step S26.

In step S26, the control device 38 operates the actuator 90 and causes the valve opening/closing member 88 to move to the withdrawn position. Due thereto, the operation of opening the outer cover 58 becomes possible. Therefore, due to the outer cover 58 and the flapper valve 74 respectively being made able to be opened by the refueling nozzle 100, there becomes a state in which refueling is possible.

Operation and effects of the refueling portion structure 24 of the present embodiment are described next.

At the refueling portion structure 24, when the lid opening switch 36 is operated to open the fuel lid 32, the sealing valve 47 is opened by the control device 38 of the valve opening/closing device 86. When the sealing valve 47 is opened, vapor, that includes evaporated fuel within the fuel tank 22, passes-through the vapor pipe 44 and moves to the canister 42, and the atmospheric air component, from which the evaporated fuel is separated at the canister 42, passes-through the atmosphere communication pipe 46 and is released into the atmosphere. Due thereto, the tank internal pressure P is reduced. The sealing valve 47 is maintained in an open state until the tank internal pressure P becomes less than or equal to the set value N.

Here, in a case in which the tank internal pressure P exceeds the set value N that is set in advance, the control device 38 controls the actuator 90 and causes the valve opening/closing member 88 to move to the abutting position. Therefore, the top surface of the distal end portion of the valve opening/closing member 88 abuts the projecting portion 58B of the outer cover 58, and the opening operation of the outer cover 58 is inhibited. Thus, even if the outer cover 58 is pushed by the refueling nozzle 100, the flow path 56 is not opened, i.e., the closed state of the outer cover 58 is maintained. In this way, because the closed state of the outer cover 58 is maintained in a case in which the tank internal pressure P exceeds the set value N, fuel that has evaporated is not released from the filler pipe 26.

On the other hand, in a case in which the tank internal pressure P is less than or equal to the set value N, the control device 38 controls the actuator 90 and causes the valve opening/closing member 88 to move to the withdrawn position. Therefore, the valve opening/closing member 88 does not abut the outer cover, and the opening operation of the outer cover 58 is permitted. Thus, the flow path 56 is opened due to the outer cover 58 being pushed by the refueling nozzle 100. At this time, because the tank internal pressure P is less than or equal to the set value N, forceful releasing of the evaporated fuel from the filler pipe 26 is suppressed.

Accordingly, in accordance with the refueling portion structure 24, when the outer cover 58 within the filler pipe 26 is opened at the time of refueling, evaporated fuel being forcefully released from the filler pipe 26 can be suppressed reliably.

Further, at the refueling portion structure 24, the permitting and the inhibiting of the opening operation of the outer cover 58 are switched by the simple structure of controlling the actuator 90 by the control device 38 and moving the valve opening/closing member 88.

Moreover, after the refueling nozzle 100 is inserted into the filler pipe 26 and the outer cover 58 and the flapper valve 74 are respectively opened, refueling of the fuel tank 22 becomes possible.

Further, at the time of refueling, because the liquid surface of the fuel L within the fuel tank 22 rises, even if the sealing valve 47 is open, the tank internal pressure P rises. Thus, there are cases in which, before the refueling nozzle 100 is pulled-out and the outer cover 58 returns to the closed state, the tank internal pressure P exceeds the set value N, and the control device 38 operates the actuator 90, and the valve opening/closing member 88 moves to the abutting position. In this case as well, at the refueling portion structure 24, when the valve opening/closing member 88 is pushed by the outer cover 58 that is in the midst of the closing operation, the moving force of the outer cover 58 (the urging force of the urging spring 84) becomes, via the inclined surface 88C, force of elastically deforming (compressively deforming) the coil spring 98 that elastically supports the valve opening/closing member 88, and the valve opening/closing member 88 is made to temporarily withdraw from the locus of movement of the outer cover 58. Therefore, the closing operation of the outer cover 58 is not impeded, and the outer cover 58 closes the flow path 56. Further, when the outer cover 58 goes past, the valve opening/closing member 88 returns to onto the locus of movement of the outer cover 58 due to the restoring force of the coil spring 98. Then, the valve opening/closing member 88 and the projecting portion 58B of the outer cover 58 abut one another, and the opening operation of the outer cover 58 is inhibited. In this way, by providing the coil spring 98 between the valve opening/closing member 88 and the actuator 90 and forming the inclined surface 88C at the valve opening/closing member 88, the outer cover 58 can be reliably set in the closed state even in a case in which the valve opening/closing member 88 is moving to the abutting position before the refueling nozzle 100 is pulled out and the outer cover 58 has returned to the closed state.

In the first embodiment, there is a structure in which, in a case in which the tank internal pressure P exceeds the set value N, the top surface of the distal end portion of the valve opening/closing member 88 abuts the projecting portion 58B of the outer cover 58 that is in the closed state, and inhibits the opening operation of the outer cover 58. However, the present invention is not limited to this structure. For example, there may be a structure in which, when the outer cover 58 opens slightly, the top surface of the distal end portion of the valve opening/closing member 88 abuts the projecting portion 58B, i.e., restricts the opening operation of the outer cover 58. Note that a structure in which the opening operation of the outer cover 58 is restricted by the valve opening/closing member 88 may be applied to a second embodiment that is described hereinafter.

Further, in the first embodiment, there is a structure in which the valve opening/closing member 88 is moved rectilinearly between the abutting position and the withdrawn position by using the actuator 90. However, the present invention is not limited to this structure. For example, there may be a structure in which the valve opening/closing member is rotated between the abutting position and the withdrawn position by using another actuator (as an example, a rotary actuator).

Still further, in the first embodiment, there is a structure in which the inclined surface 88C is formed at the corner portion at the lower side of the distal end portion of the valve opening/closing member 88, but the present invention is not limited to this structure. For example, there may be a structure in which the inclined surface 88C is not formed at the corner portion at the lower side of the distal end portion of the valve opening/closing member 88, and instead, an inclined surface is formed at the upper edge portion of the outer cover 58 that abuts the corner portion at the lower side of the distal end portion of the valve opening/closing member 88. Further, there may be a structure in which the inclined surface 88C is formed at the valve opening/closing member 88, and an inclined surface, that corresponds to this inclined surface 88C, is formed at the upper edge portion of the outer cover 58 that abuts the inclined surface 88C.

Second Embodiment

A refueling portion structure 110 of a second embodiment of the present invention is described next with reference to FIG. 9 through FIG. 12. Note that structures that are similar to those of the first embodiment are denoted by the same reference numerals, and description thereof is omitted as appropriate.

Figure 9:
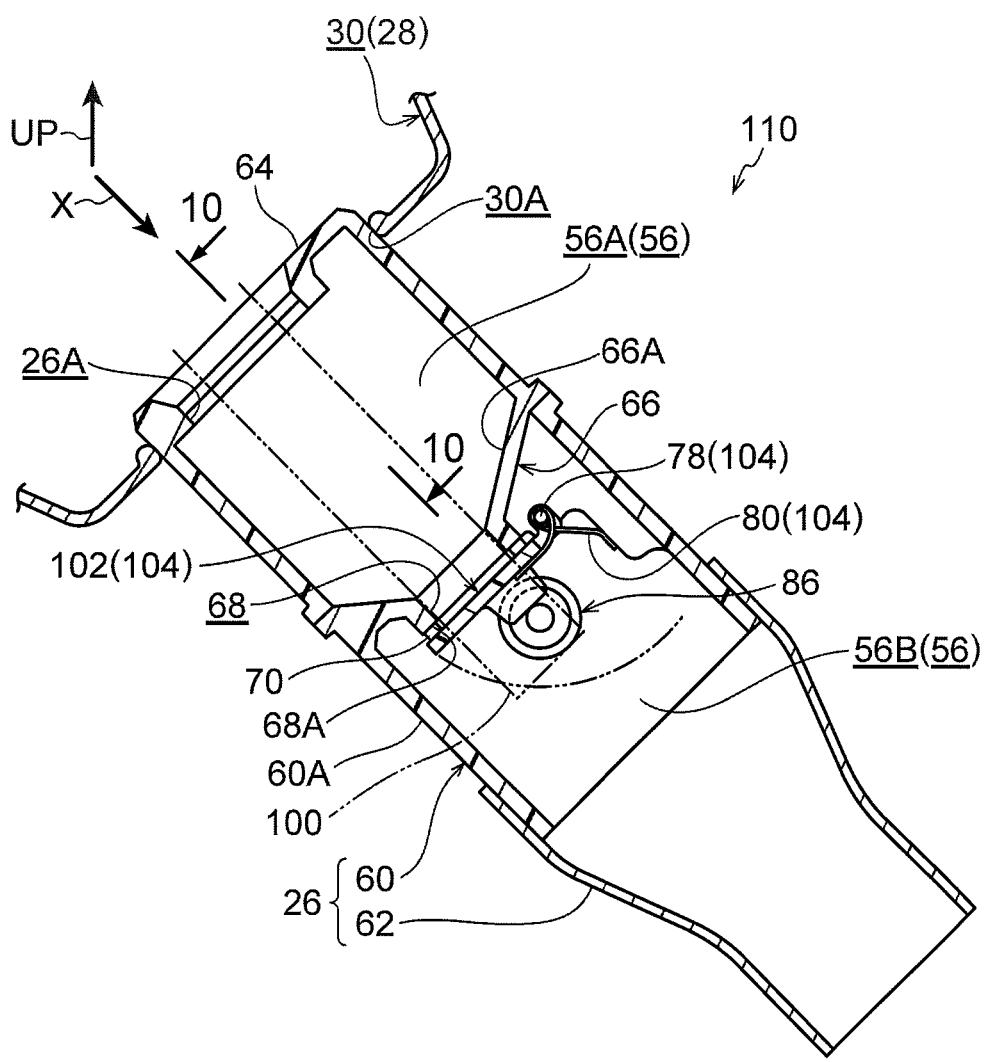
FIG. 9 is a cross-sectional view along the axial direction of the refueling pipe that is used in a refueling portion structure of a fuel tank of a second embodiment.
Figure 10:
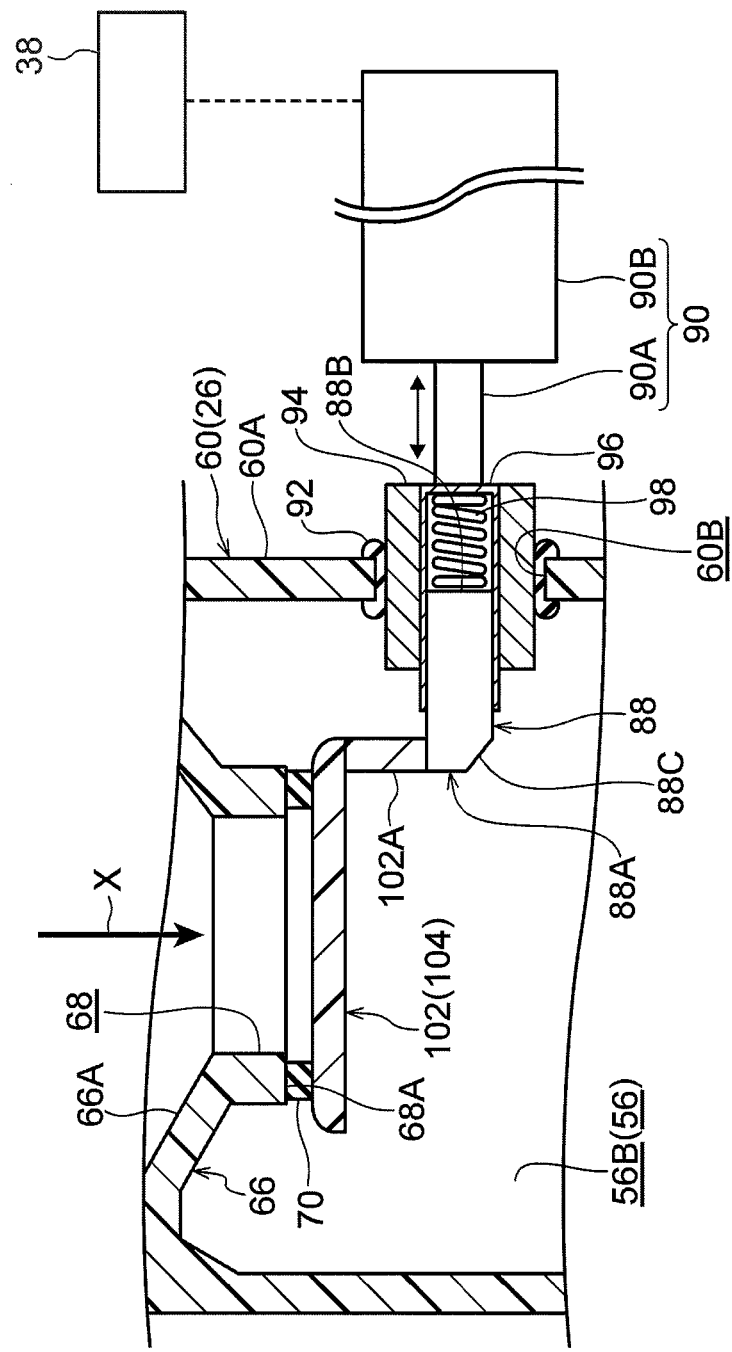
FIG. 10 is a cross-sectional view in which the refueling pipe of FIG. 9 is cut along line 10-10, and shows a state in which opening operation of an opening/closing valve is inhibited by the valve opening/closing member.
Figure 11:
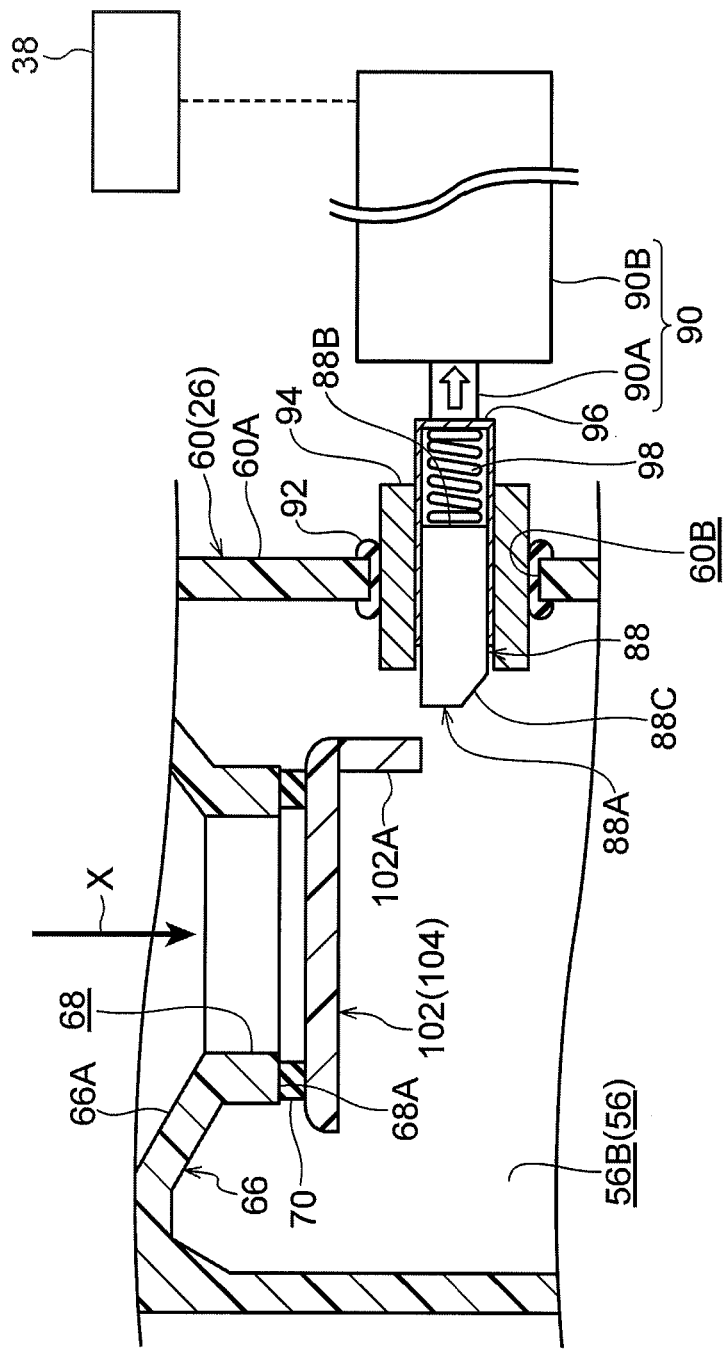
FIG. 11 is a cross-sectional view corresponding to the cross-sectional view of FIG. 10, and shows a state in which the opening operation of the opening/closing valve is permitted.
Figure 12:
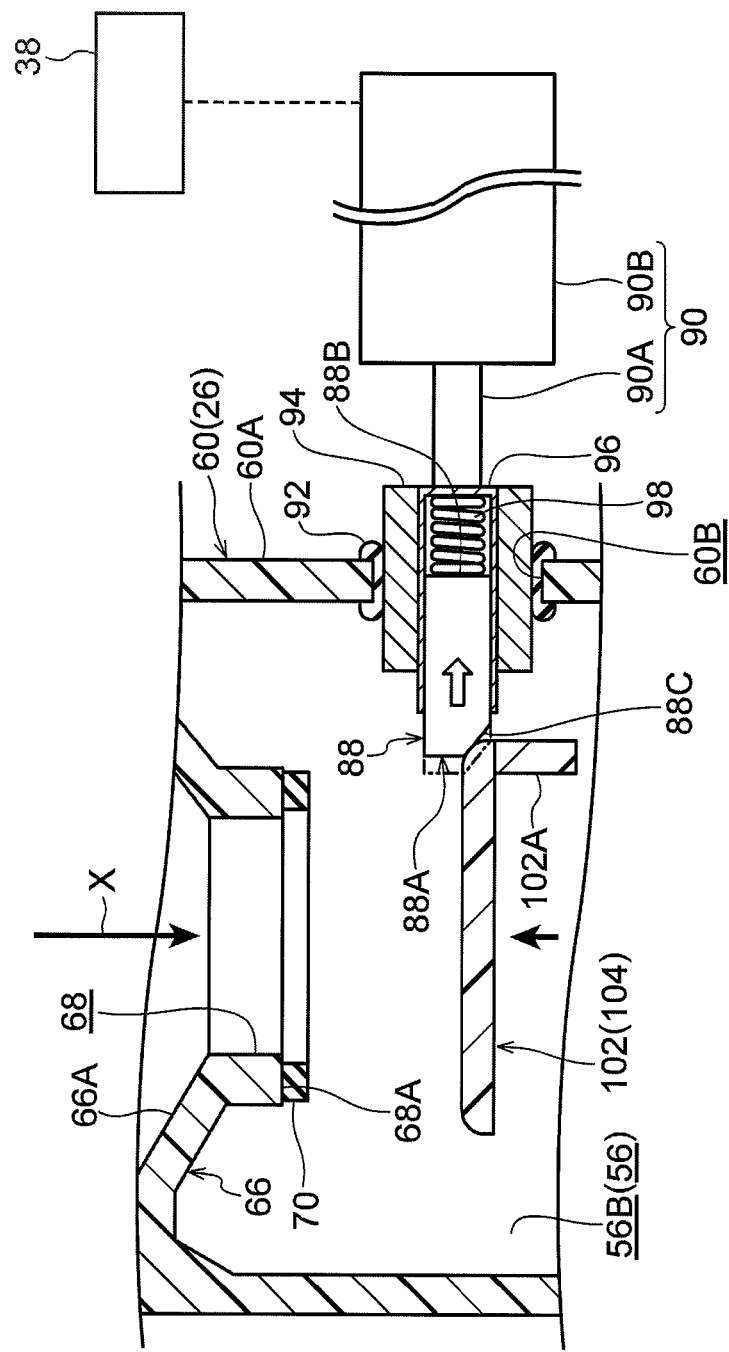
FIG. 12 is a cross-sectional view corresponding to the cross-sectional view of FIG. 10, and shows the operation of the valve opening/closing member temporarily withdrawing from the locus of movement of the opening/closing valve, due to the opening/closing valve that is in the midst of closing operation.

As shown in FIG. 9, in the refueling portion structure 110, as compared with the refueling portion structure 24 of the first embodiment, the second opening/closing portion 76 that includes the outer cover 58 is not provided within the filler pipe 26, and only a first opening/closing portion 104 that includes a flapper valve 102 is provided. Therefore, in the refueling portion structure 110, the valve opening/closing member 88 is disposed further toward the far side than the flapper valve 102, and inhibits the opening operation of the flapper valve 102. A projecting portion 102A is formed at the lower edge portion (the outer edge portion at the far side) of the flapper valve 102, and the valve opening/closing member 88 abuts the peak portion of this projecting portion 102A. Note that, other than the structure of the projecting portion 102A, the flapper valve 102 has the same structure as the flapper valve 74 of the first embodiment. Further, the processing of the control device 38 causing the valve opening/closing member 88 to move between the abutting position (the position shown in FIG. 10) of abutting the flapper valve 102 and the withdrawn position (the position shown in FIG. 11) of not abutting the flapper valve 102, is similar to the first embodiment. Note that the flapper valve 102 of the present embodiment is an example of the opening/closing valve of the present invention.

Operation and effects of the refueling portion structure 110 of the present embodiment are described next. Note that description is omitted of operation and effects that are obtained by structures that are similar to those of the refueling portion structure 24 of the first embodiment.

In the refueling portion structure 110, as compared with the refueling portion structure 24 of the first embodiment, the second opening/closing portion 76 is not provided within the filler pipe 26, and therefore, the number of parts can be reduced. Further, the structure of the refueling port member 60 can be made to be simple.

Although, in the first embodiment, there is a structure in which the opening operation of the outer cover 58 is inhibited by the valve opening/closing member 88, the present invention is not limited to this structure. For example, there may be a structure in which the opening operation of the flapper valve 74 is inhibited by the valve opening/closing member 88. Further, there may be a structure in which the valve opening/closing devices 86 are disposed at two places, and the opening operations of both the outer cover 58 and the flapper valve 74 are inhibited by the respective valve opening/closing members 88.

Further, in the first embodiment, the coil spring 98 is disposed between the valve opening/closing member 88 and the sliding member 96, but the present invention is not limited to this structure, and another elastic member may be disposed provided that it can elastically support the valve opening/closing member 88. For example, there may be a structure in which a rubber elastic body, that serves as an example of the elastic member of the present invention, is disposed between the valve opening/closing member 88 and the sliding member 96, and this elastic body is elastically deformed, and the valve opening/closing member 88 is temporarily withdrawn from the locus of movement of the outer cover 58.

Although the projecting portion 58B is formed at the outer cover 58 in the first embodiment, the present invention is not limited to this structure. For example, the valve opening/closing member 88 may be made to abut the lower edge portion (the edge portion at the far side) of the outer cover 58 and inhibit the opening operation of the outer cover 58. Or, a step portion may be formed in the edge portion periphery of the outer cover 58, and the top surface of the distal end portion of the valve opening/closing member 88 may be made to abut this step portion and inhibit the opening operation of the outer cover 58. Note that the above-described structures relating to the abutting portions of the outer cover 58 and the valve opening/closing member 88 may be applied to the second embodiment.

Although embodiments of the present invention have been described above, the present invention is not limited to the above description, and, of course, can be embodied by being modified in various ways other than those described above within a scope that does not depart from the gist thereof.

All publications, patent applications, and technical standards mentioned in the present specification are incorporated by reference into the present specification to the same extent as if such individual publication, patent application, or technical standard was specifically and individually indicated to be incorporated by reference.

What is claimed is:

1. A refueling portion structure of a fuel tank, comprising:
   a refueling pipe that has a refueling port into which a refueling nozzle is to be inserted, and that communicates with a fuel tank;
   an opening/closing valve that is provided on a flow path within the refueling pipe and closes the flow path, and that, when pushed by the refueling nozzle, opens the flow path; and
   a valve opening/closing device that, in a case in which a tank internal pressure of the fuel tank exceeds a set value that is set in advance, inhibits partial opening operation or full opening operation of the opening/closing valve, and, in a case in which the tank internal pressure is less than or equal to the set value, permits the opening operation of the opening/closing valve.

2. The refueling portion structure of claim 1, wherein the valve opening/closing device has:
   a valve opening/closing member that abuts the opening/closing valve and inhibits the partial opening operation or the full opening operation of the opening/closing valve;

a moving device that moves the valve opening/closing member between an abutting position of abutting the opening/closing valve and a withdrawn position of not abutting the opening/closing valve; and a control device that controls the moving device, and that causes the valve opening/closing member to move to the abutting position in a case in which the tank internal pressure exceeds the set value, and causes the valve opening/closing member to move to the withdrawn position in a case in which the tank internal pressure is less than or equal to the set value.

3. The refueling portion structure of claim 2, wherein an elastic member is provided between the valve opening/closing member and the moving device, such that when the valve opening/closing member that is at the abutting position is pushed by the opening/closing valve that is in the midst of closing operation, the elastic member elastically deforms and causes the valve opening/closing member to temporarily withdraw from a locus of movement of the opening/closing valve.

4. The refueling portion structure of claim 3, wherein:
the valve opening/closing member is shaped as a pillar, an inclined surface is formed at a fuel tank side corner portion of one end portion of the valve opening/closing member, and another end portion of the valve opening/closing member is elastically supported by the elastic member with respect to the moving device, and in a case in which the valve opening/closing member is at the abutting position, the inclined surface is pushed by the opening/closing valve that is in the midst of the closing operation.

5. The refueling portion structure of claim 2, further comprising:
a lid that is provided at a vehicle body, that, in a closed state, covers the refueling port, and that, due to an opening switch being operated to open the lid, is opened and exposes the refueling port; and a pressure reducing device that is connected to the fuel tank, is controlled by the control device, and reduces the tank internal pressure when the opening switch is operated to open the lid.

6. The refueling portion structure of claim 5, wherein the control device causes the tank internal pressure to be reduced by the pressure reducing device, until the tank internal pressure becomes less than or equal to the set value.

* * * * *